US011063732B2

(12) United States Patent
Ramamurthi et al.

(10) Patent No.: US 11,063,732 B2
(45) Date of Patent: *Jul. 13, 2021

(54) DYNAMICALLY CONFIGURABLE HYBRID AUTOMATIC REPEAT REQUEST (HARQ) CONFIGURATION

(71) Applicant: Verizon Patent and Licensing Inc., Arlington, VA (US)

(72) Inventors: Vishwanath Ramamurthi, San Ramon, CA (US); Arda Aksu, Lafayette, CA (US); Ozgur Dural, Sunnyvale, CA (US); Yuexin Dong, Highland Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,472

(22) Filed: Aug. 30, 2019

(65) Prior Publication Data

US 2019/0386805 A1 Dec. 19, 2019

Related U.S. Application Data

(63) Continuation of application No. 15/339,478, filed on Oct. 31, 2016, now Pat. No. 10,432,380.

(51) Int. Cl.
*H04L 5/00* (2006.01)
*H04L 1/18* (2006.01)

(52) U.S. Cl.
CPC .......... *H04L 5/0055* (2013.01); *H04L 1/1893* (2013.01); *H04L 1/1896* (2013.01); *H04L 5/0096* (2013.01); *H04L 1/189* (2013.01); *H04L 1/1822* (2013.01)

(58) Field of Classification Search
None
See application file for complete search history.

(56) References Cited

U.S. PATENT DOCUMENTS

| 2015/0085718 | A1* | 3/2015 | Chen ..................... H04L 1/1812 370/280 |
| 2015/0271837 | A1* | 9/2015 | Larsson ............... H04B 7/2615 370/329 |
| 2016/0192369 | A1* | 6/2016 | Suzuki .................. H04L 1/1854 370/329 |
| 2016/0323070 | A1 | 11/2016 | Chen |

* cited by examiner

*Primary Examiner* — Peter Chen
*Assistant Examiner* — Jeff Banthrongsack (57) ABSTRACT

A device may determine one or more parameters relating to a network. The device may detect a trigger to alter a hybrid automatic repeat request (HARQ) configuration for the network based on the one or more parameters relating to the network. The device may determine an alteration to the HARQ configuration based on detecting the trigger to alter the HARQ configuration. The device may communicate with a distributed unit or a centralized unit of the network to cause the alteration to the HARQ configuration.

20 Claims, 5 Drawing Sheets

DYNAMICALLY CONFIGURABLE HYBRID AUTOMATIC REPEAT REQUEST (HARQ) CONFIGURATION

CROSS REFERENCE TO RELATED APPLICATION

This application is a continuation of U.S. patent application Ser. No. 15/339,478 filed Oct. 31, 2016, the content of which is herein incorporated by reference in its entirety.

BACKGROUND

Hybrid automatic repeat request (HARQ) protocol is utilized to ensure that messages are sent reliably from one node to another node in a network. For example, HARQ protocol is used to transmit data between a radio access network (RAN) and a user equipment (UE) or a customer premise equipment (CPE) of a telecommunications network. HARQ designs may impose latency requirements based on where a HARQ-protocol terminating node is located in the RAN (e.g. in a Centralized Unit (CU) location or in a distributed unit (DU) or remote radio head (RRH) location). The latency requirements may have an impact on connections between the core network and the RRH or another type of distributed base station.

DETAILED DESCRIPTION OF PREFERRED EMBODIMENTS

The following detailed description of example implementations refers to the accompanying drawings. The same reference numbers in different drawings may identify the same or similar elements.

Automatic repeat request (ARQ) is an error-control method for data transmission in telecommunications networks. ARQ uses acknowledgements (ACKs) (e.g., messages sent by a receiving node indicating that the receiving node has correctly received data from the sending node) and timeouts (e.g., specified periods of time allowed to elapse before an ACK is to be received) to achieve reliable data transmission over an unreliable service. If a sending node does not receive an ACK before the timeout, the sending node may retransmit the data until the sending node receives an ACK or exceeds a predefined number of retransmissions.

HARQ is a combination of high-rate forward error-correcting coding and ARQ error-control. In standard ARQ, redundant bits are added to data to be transmitted using an error-detecting (ED) code, such as a cyclic redundancy check (CRC). In HARQ, the original data is encoded with a forward error correction (FEC) code, and parity bits in the FEC are either immediately sent along with the message or transmitted only upon request when a receiving node detects an erroneous message.

HARQ has a fixed set of delay requirements for Long-Term Evolution (LTE) and/or LTE-Advanced (LTE-A) telecommunications networks. For example, LTE/LTE-A telecommunications networks may require a receiving node to send a HARQ ACK within a particular transmission time interval (TTI). The TTI may vary based on where the HARQ functionality is located in the network, such as in a back-haul of the network, a mid-haul of the network, or a front-haul of the network. As a consequence, the HARQ delay requirements may limit network architectures and services. In other words, network architectures and services may be limited to those that satisfy HARQ delay requirements.

Implementations, described herein, may dynamically configure HARQ parameters based on multiple parameters. For example, HARQ parameters may be dynamically configured based on front-haul/back-haul transport network capabilities (e.g., bandwidth, latency, or the like), based on an underlying radio access network (RAN) split or a dynamically configured RAN split, based on network slicing, based on user equipment (UE) capabilities, based on an application quality of service (QoS) requirement, or the like. Moreover, implementations, described herein, may dynamically configure HARQ parameters based on network metrics (e.g., HARQ ACK timing, a number of HARQ processes, a number of HARQ repetitions, or the like.). For example, implementations, described herein, may dynamically configure HARQ parameters to accommodate an observed TTI regardless of where the HARQ functionality is located in the network. Furthermore, implementations, described herein, may dynamically configure HARQ parameters to enable particular use cases. For example, HARQ parameters may be dynamically configured for an extreme fixed/mobile broadband use case, a massive Internet of Things (IoT) use case, an ultra-low latency use case, or the like.

In this way, flexibility is improved for network architectures and network deployments, thereby improving network performance and reducing cost relative to a static network architecture and deployment. Additionally, network performance is improved as a result of enabling increased centralization of network resources and/or functionalities for RRHs. In this way, a flexible RAN split of functionalities between a centralized unit and a distributed unit of a network is enabled by configuring HARQ based on a network configuration, a network architecture, a use case, a network slice, a performance requirement, or the like, which enables, relative to a static RAN, reduced utilization of computing resources (e.g., processing resources, memory resources, and/or energy resources), cost efficient design, or the like.

Figure 1:
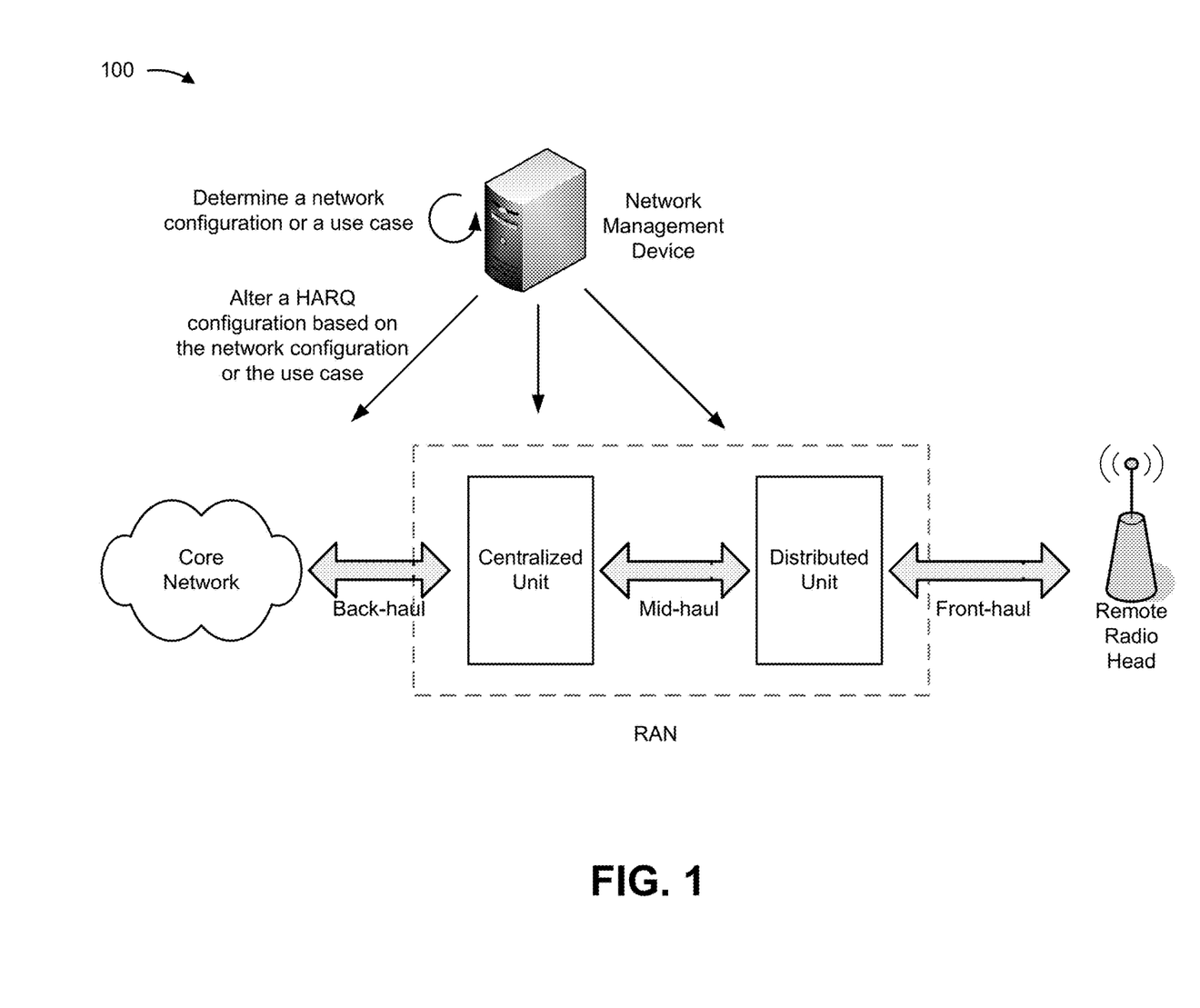
FIG. 1 is a diagram of an overview of an example implementation described herein.

FIG. 1 is a diagram of an overview of an example implementation 100 described herein. Example implementation 100 includes a network, which includes a network management device, a core network, a RAN, and an RRH. The RAN includes a centralized unit and a distributed unit. The centralized unit communicates with the core network via a back-haul. The centralized unit communicates with the distributed unit via a mid-haul. The distributed unit communicates with the RRH via a front-haul.

As further shown in FIG. 1, the network management device determines a network configuration or a use case. For example, based on detecting a trigger (e.g., input, from a network operator to a client device, that is communicated to the network management device; determining that a network metric satisfies a threshold; or determining an alteration to a network architecture or a network deployment), the network management device may determine a network configuration or a use case, and may determine to alter a HARQ configuration based on the network configuration or the use case. The network management device may alter a HARQ configuration based on the network configuration or the use case. For example, the network management device may alter an ACK time, a quantity of processes, a quantity of repetitions, or the like for the HARQ protocol being used by the network. In this way, the network management device uses a dynamic HARQ configuration to enable network architectures and network deployments to be flexible. Additionally, the network management device uses the dynamically configurable HARQ to enable better network performance because additional centralization of network resources for RRHs is permitted.

As indicated above, FIG. 1 is provided merely as an example. Other examples are possible and may differ from what was described with regard to FIG. 1.

Figure 2A:
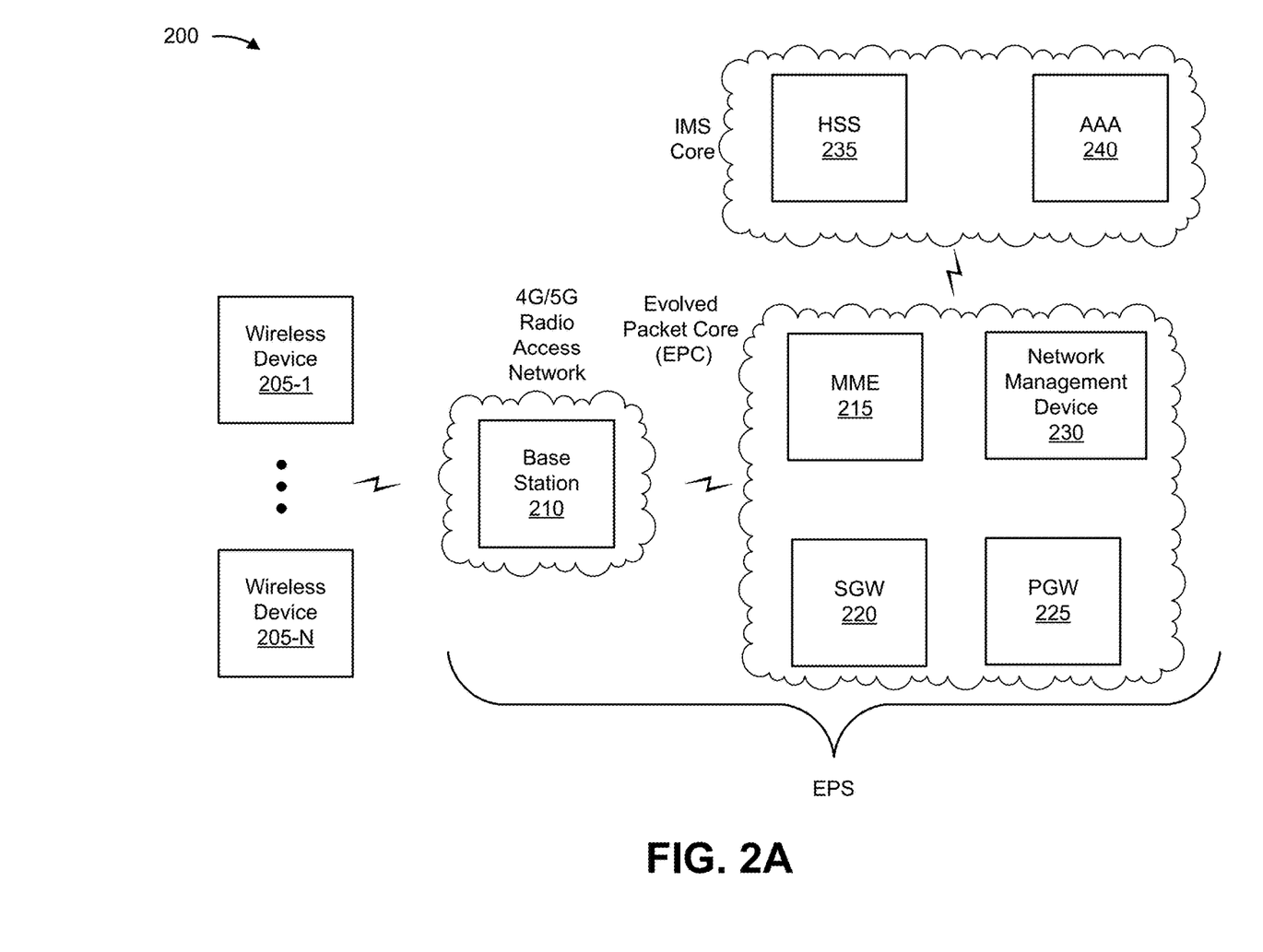
FIGS. 2A and 2B are diagrams of an example environment in which systems and/or methods, described herein, may be implemented.
Figure 2B:
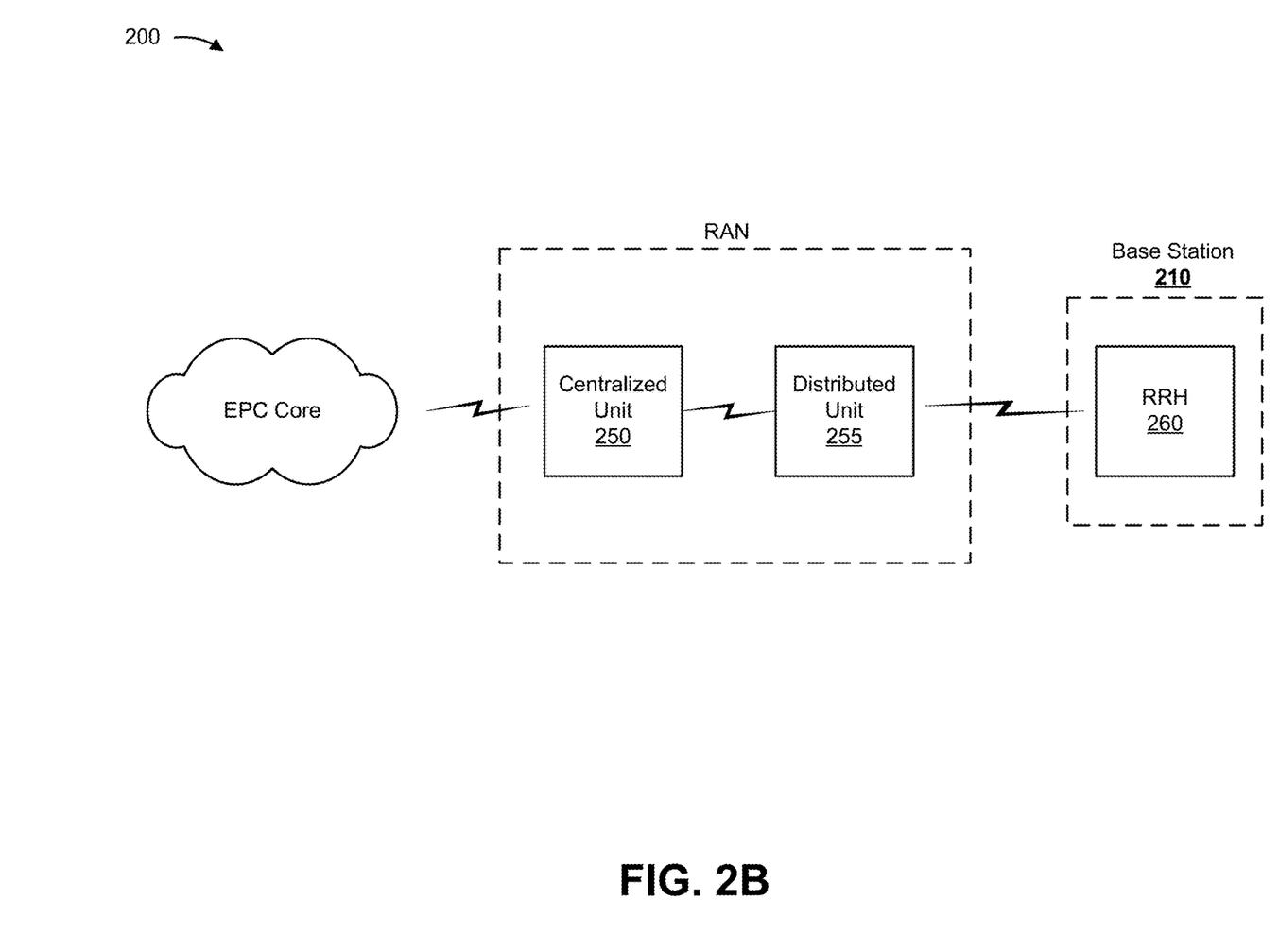

FIGS. 2A and 2B are diagrams of an example environment 200 in which systems and/or methods, described herein, may be implemented. As shown in FIG. 2A, environment 200 may include one or more wireless devices 205-1 through 205-N (N≥1) (hereinafter referred to collectively as "wireless devices 205," and individual as "wireless device 205"); a base station 210; a mobility management entity device (MME) 215; a serving gateway (SGW) 220; a packet data network gateway (PGW) 225; a network management device 230; a home subscriber server (HSS) 235; and an authentication, authorization, and accounting server (AAA) 240. Devices of environment 200 may interconnect via wired connections, wireless connections, or a combination of wired and wireless connections.

Some implementations are described herein as being performed within an LTE network for explanatory purposes. Some implementations may be performed within a network that is not an LTE network, such as a third generation (3G) network, a fourth generation (4G) network, a fifth generation (5G) network, or the like.

Environment 200 may include an evolved packet system (EPS) that includes a 4G or 5G radio access network (e.g., an LTE network and/or an evolved packet core (EPC) that operate based on a third generation partnership project (3GPP) wireless communication standard). For example, the LTE network may include a RAN that includes one or more base stations 210 that take the form of evolved Node Bs (eNBs) via which wireless device 205 communicates with the EPC. The EPC may include MME 215, SGW 220, PGW 225, and/or network management device 230 that enable wireless device 205 to communicate with the network and/or an Internet protocol (IP) multimedia subsystem (IMS) core. The IMS core may include HSS 235 and/or AAA 240, and may manage device registration and authentication, session initiation, or the like, associated with wireless devices 205. HSS 235 and/or AAA 240 may reside in the EPC and/or the IMS core.

Wireless device 205 includes one or more devices capable of communicating with base station 210 and/or a network. For example, wireless device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. Wireless device 205 may send traffic to and/or receive traffic from the network (e.g., via base station 210, SGW 220, and/or PGW 225). In some implementations, wireless device 205 may include a user device type of wireless device 205, such as a user equipment (UE), a mobile device, or the like. Additionally, or alternatively, wireless device 205 may include a machine device type of wireless device, such as an Internet of Things (IoT) type of device, a Category M1 (Cat-M1) device, a narrow band IoT (NB-IoT) device, or the like. In some implementations, wireless device 205 may be associated with a particular QoS classification.

Base station 210 includes one or more devices capable of transferring traffic, such as audio, video, text, and/or other traffic, destined for and/or received from wireless device 205. In some implementations, base station 210 may include an eNB associated with the LTE network that receives traffic from and/or sends traffic to the network via SGW 220 and/or PGW 225. Additionally, or alternatively, one or more base stations 210 may be associated with a RAN that is not associated with the LTE network. Base station 210 may send traffic to and/or receive traffic from wireless device 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with wireless device 205. In some implementations, MME 215 may perform operations relating to authentication of wireless device 205. Additionally, or alternatively, MME 215 may facilitate the selection of a particular SGW 220 and/or a particular PGW 225 to serve traffic to and/or from wireless device 205. MME 215 may perform operations associated with handing off wireless device 205 from a first base station 210 to a second base station 210 when wireless device 205 is transitioning from a first cell associated with the first base station 210 to a second cell associated with the second base station 210. Additionally, or alternatively, MME 215 may select another MME (not pictured), to which wireless device 205 should be handed off (e.g., when wireless device 205 moves out of range of MME 215).

SGW 220 includes one or more devices capable of routing traffic. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to the network (e.g., via PGW 225) and/or other network devices associated with the EPC and/or the IMS core. SGW 220 may also receive traffic from the network and/or other network devices, and may send the received traffic to wireless device 205 via base station 210. Additionally, or alternatively, SGW 220 may perform operations associated with handing off wireless device 205 to and/or from an LTE network.

PGW 225 includes one or more devices capable of providing connectivity for wireless device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to the network. Additionally, or alternatively, PGW 225 may receive traffic from the network, and may send the traffic to wireless device 205 via SGW 220 and base station 210. PGW 225 may record data usage information (e.g., byte usage), and may provide the data usage information to AAA 240.

Network management device 230 includes one or more devices capable of managing a network. For example, network management device 230 may include a server that controls a configuration of one or more network devices (e.g., one or more wireless devices 205, one or more base stations 210, or one or more devices described herein with regard to FIG. 2B), such as a HARQ configuration. In some implementations, network management device 230 may control one or more parameters relating to the HARQ configuration, such as a latency requirement, a HARQ ACK timing, a quantity of processes for HARQ, a quantity of repetitions for HARQ, or the like. In some implementations, network management device 230 may reside in base station 210. For example, network management device 230 may be a self-organizing network (SON) functionality of base station 210. In some implementations, network management device 230 may reside in another device, such as one or more devices described herein with regard to FIG. 2B.

HSS 235 includes one or more devices, such as one or more server devices, capable of managing (e.g., receiving, generating, storing, processing, and/or providing) information associated with wireless device 205. For example, HSS 235 may manage subscription information associated with wireless device 205, such as information that identifies a subscriber profile of a user associated with wireless device 205, information that identifies services and/or applications that are accessible to wireless device 205, location information associated with wireless device 205, a network identifier (e.g., a network address) that identifies wireless device 205, information that identifies a treatment of wireless device 205 (e.g., quality of service information, a quantity of minutes allowed per time period, a quantity of data consumption allowed per time period, or the like.), and/or similar information. HSS 235 may provide this information to one or more other devices of environment 200 to support the operations performed by those devices.

AAA 240 includes one or more devices, such as one or more server devices, that perform authentication, authorization, and/or accounting operations for communication sessions associated with wireless device 205. For example, AAA 240 may perform authentication operations for wireless device 205 and/or a user of wireless device 205 (e.g., using one or more credentials), may control access, by wireless device 205, to a service and/or an application (e.g., based on one or more restrictions, such as time-of-day restrictions, location restrictions, single or multiple access restrictions, read/write restrictions, or the like.), may track resources consumed by wireless device 205 (e.g., a quantity of voice minutes consumed, a quantity of data consumed, or the like.), and/or may perform similar operations.

As shown in FIG. 2B, example environment 200 includes the EPC core (e.g., a core network); a RAN, which includes a centralized unit 250 and a distributed unit 255; and base station 210, which includes a remote radio head (RRH) 260. Centralized unit 250 and distributed unit 255 may refer to portions of the RAN architecture in which various functionalities may reside (e.g., where a server or another type of network device may perform the various functionalities). For example, centralized unit 250 may include a server, a cluster of servers, a cloud server, a server farm, or the like that is located at a centralized location and performs processing for multiple distributed units 255 and/or RRHs 260. In this case, centralized unit 250 may communicate with the EPC core via a back-haul connection and may communicate with distributed unit 255 via a mid-haul connection. Similarly, distributed unit 255 may refer to a server that is located within a threshold proximity of RRH 260. In this case, distributed unit 255 may communicate with RRH 260 via a front-haul connection. RRH 260 may refer to a portion of a base station 210 (e.g., a transceiver). For example, centralized unit 250 and distributed unit 255 may perform various functionalities of base station 210 relating to transmitting and/or receiving network traffic, and may utilize RRH 260 as an air interface for transmitting and/or receiving.

In some implementations, a RAN split of functionalities between centralized unit 250 and distributed unit 255 may be associated with a portion of a layer. For example, using a flexible RAN split may cause one or more functionalities of Layer 3 (e.g., radio resource control (RRC) functionalities or Internet Protocol (IP) functionalities), Layer 2 (e.g., packet data convergence protocol (PDCP) functionalities, radio link control (RLC) functionalities, or medium access control (MAC) functionalities), Layer 1 (e.g., bit processing functionalities, modulation functionalities, radio element mapping functionalities), or a radio frequency interface (e.g., common public radio interface (CPRI) to radio frequency (RF) modulation functionalities) to be performed by centralized unit 250 or distributed unit 255 based on a processing requirement, a latency requirement, or the like, as described herein. In this way, a flexible RAN split of functionalities between centralized unit 250 and distributed unit 255 based on a network configuration, a network architecture, a use case, a network slice, a performance requirement, or the like may enable, relative to a static RAN, reduced utilization of computing resources (e.g., processing resources, memory resources, and/or energy resources), cost efficient design, or the like.

The number and arrangement of devices and networks shown in FIGS. 2A and 2B are provided as an example. In practice, there may be additional devices and/or networks, fewer devices and/or networks, different devices and/or networks, or differently arranged devices and/or networks than those shown in FIGS. 2A and 2B. Furthermore, two or more devices shown in FIGS. 2A and 2B may be implemented within a single device, or a single device shown in FIGS. 2A and 2B may be implemented as multiple, distributed devices. Additionally, or alternatively, a set of devices (e.g., one or more devices) of environment 200 may perform one or more functions described as being performed by another set of devices of environment 200.

Figure 3:
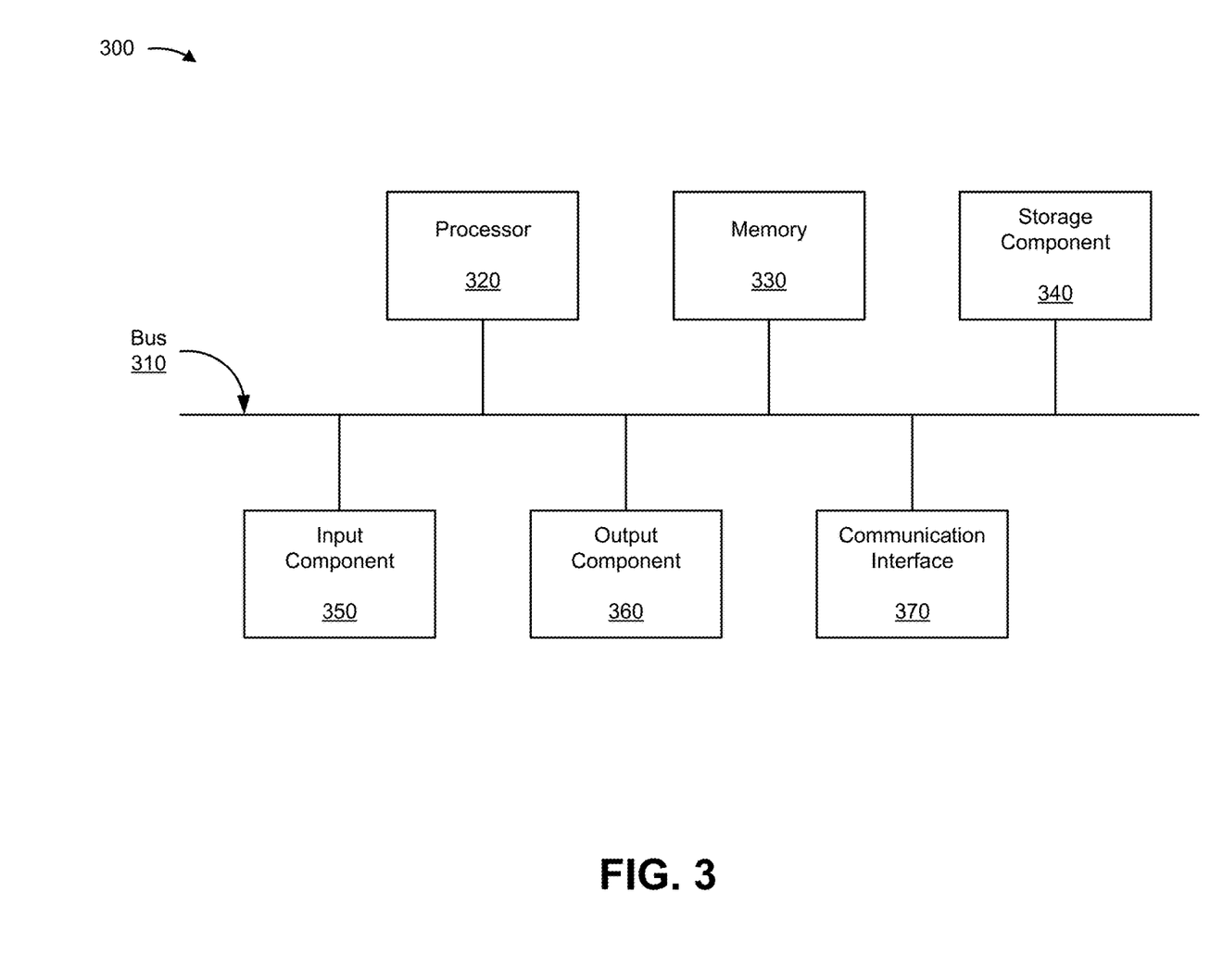
FIG. 3 is a diagram of example components of one or more devices of FIGS. 2A and 2B.

FIG. 3 is a diagram of example components of a device 300. Device 300 may correspond to wireless device 205, base station 210, MME 215, SGW 220, PGW 225, network management device 230, HSS 235, AAA 240, centralized unit 250, distributed unit 255, and/or RRH 260. In some implementations, wireless device 205, base station 210, MME 215, SGW 220, PGW 225, network management device 230, HSS 235, AAA 240, centralized unit 250, distributed unit 255, and/or RRH 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
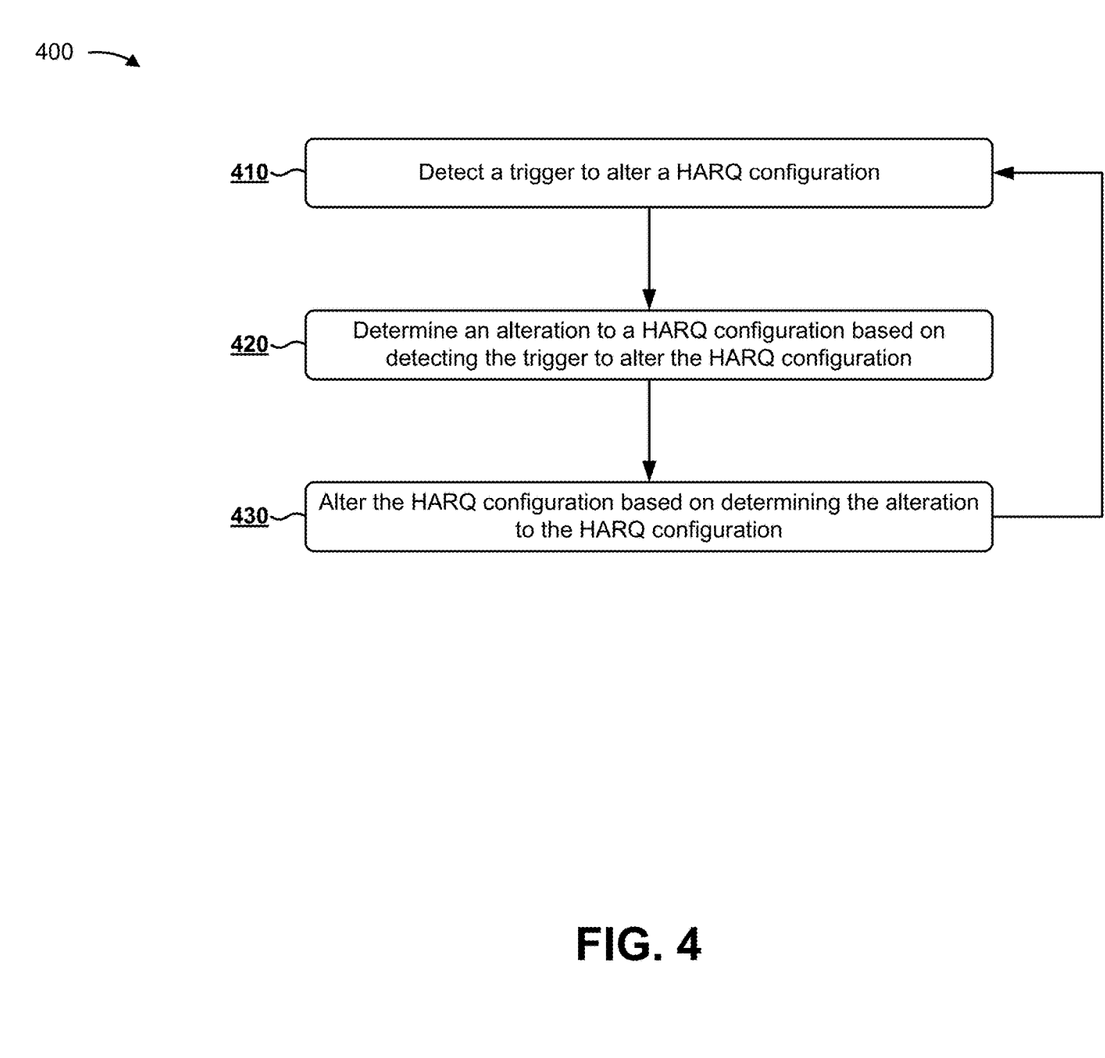
FIG. 4 is a flow chart of an example process for network configuration of a hybrid automatic repeat request (HARQ).

FIG. 4 is a flow chart of an example process 400 for network configuration of a HARQ. In some implementations, one or more process blocks of FIG. 4 may be performed by network management device 230. In some implementations, one or more process blocks of FIG. 4 may be performed by another device or a group of devices separate from or including network management device 230, such as wireless device 205, base station 210, MME 215, SGW 220, PGW 225, HSS 235, AAA 240, centralized unit 250, distributed unit 255, or RRH 260.

As shown in FIG. 4, process 400 may include detecting a trigger to alter a HARQ configuration (block 410). For example, network management device 230 may detect a trigger to alter a HARQ configuration. In some implementations, network management device 230 may detect the trigger based on an instruction from a network operator. For example, a client device may receive an input via a user interface from a network operator, and the client device may transmit the instruction to network management device 230 to alter a HARQ configuration. In this way, network management device 230 may reduce utilization of computing resources relative to determining a network metric and/or detecting a trigger.

In some implementations, network management device 230 may detect the trigger based on determining that a network metric satisfies a threshold value. For example, network management device 230 may determine that a particular network metric (e.g., based on receiving information from network monitoring equipment, a set of probes that monitor network performance indicators, or the like), such as a network throughput, a quantity of network traffic, a bit error rate, a quantity of dropped packets, or the like, satisfies a threshold value, and may determine to alter the HARQ configuration. In this way, network management device 230 may reduce a period of time to alter the HARQ configuration based on utilization of the network relative to utilizing another type of trigger. In some implementations, network management device 230 may detect the trigger based on determining that an alteration to a network architecture or network deployment has occurred. For example, network management device 230 may determine that a RAN split has been altered (e.g., a division of functionalities of the RAN between centralized unit 250 and distributed unit 255 has been altered), and may determine to alter the HARQ configuration based on determining that the RAN split has been altered. In this case, network management device 230 may determine that the alteration to the network architecture or network deployment has occurred based on identifying a change to a network configuration file or database (e.g., based on determining that a date of modification of the network configuration file or database is changed). In this way, network management device 230 may ensure that the HARQ configuration permits the altered RAN split to operate.

Additionally, or alternatively, network management device 230 may determine (e.g., based on identifying a change to a network configuration file or a database) that a configuration relating to a front-haul, mid-haul, or back-haul connection transport network capability (e.g., a bandwidth requirement or capability, a latency requirement or capability, a throughput requirement or capability, an error correction requirement or capability, or the like) has been altered, and may determine to alter the HARQ configuration. In this case, network management device 230 may determine the alteration to the HARQ protocol used for the particular connection. Additionally, or alternatively, network management device 230 may determine an alteration to a network slicing (e.g., based on monitoring network control signaling, such as during setup of a slice or during dynamic reconfiguration of a slice), an alteration to wireless device 205 capabilities, an alteration in a quantity of network traffic QoS for an application, or the like, and may alter the HARQ configuration. In some implementations, network management device 230 may set the HARQ configuration at an initial startup (e.g., of network management device 230 or of the network). For example, when the network is established, network management device 230 may determine a network architecture of the network and may set the HARQ configuration based on the network architecture of the network.

In some implementations, network management device 230 may determine to alter the HARQ configuration for a particular portion of a network. For example, network management device 230 may determine to alter the HARQ configuration for a particular network layer (e.g., Layer 1 (L1), Layer 2 (L2), Layer 3 (L3), or a radio frequency (RF) layer), a particular centralized unit 250-distributed unit 255 pair, a particular link, a particular geographic area, or the like. In some implementations, network management device 230 may determine to alter the HARQ configuration for a particular network slice (e.g., a 5G logical network slice that includes a set of logical network resources for a particular use case) for a particular use case (e.g., a mobile broadband use case, an IoT use case, a 4G use case, a 5G use case, or the like), to enable a particular machine-type communication (e.g., an IoT device communication), to enable a critical machine type communication (e.g., an emergency services communication), or the like. In this case, network management device 230 may detect a trigger to include multiple HARQ configurations for the multiple network slices (e.g., multiple logical network slices sharing a common physical RAN). In some implementations, the particular use case may include a fixed broadband use case, a mobile broadband use case, a massive IoT use case (e.g., a quantity of IoT devices satisfying a threshold at a particular location), an ultra-low latency use case (e.g., a latency requirement satisfying a threshold), or the like.

As further shown in FIG. 4, process 400 may include determining an alteration to a HARQ configuration based on detecting the trigger to alter the HARQ configuration (block 420). For example, network management device 230 may determine an alteration to a HARQ configuration based on detecting the trigger to alter the HARQ configuration.

In some implementations, network management device 230 may determine that an alteration to a set of HARQ parameters, such as a HARQ ACK timing parameter or the like, is necessary. For example, although a 4G network may require a 4 millisecond HARQ ACK time and a 5G network may require a less than 4 millisecond HARQ ACK time, network management device 230 may determine that a use case of the network is for communications for which a greater than 4 millisecond HARQ ACK time results in satisfactory network performance. In this case, network management device 230 may relax a HARQ ACK timing requirement to a greater than 4 millisecond requirement. In some implementations, network management device 230 may determine an alteration to a quantity of HARQ processes, an alteration to a quantity of repetitions for HARQ, an alteration to whether the HARQ be performed in centralized unit 250 or distributed unit 255, or the like.

In some implementations, network management device 230 may determine an alteration for the HARQ based on a use case, based on a network architecture, based on a network metric (e.g., to improve network performance), based on an instruction from a network operator (e.g., indicating what to alter), or a combination of one or more criteria.

As further shown in FIG. 4, process 400 may include altering the HARQ configuration based on determining the alteration to the HARQ configuration (block 430). For example, network management device 230 may alter the HARQ configuration based on determining the alteration to the HARQ configuration.

In some implementations, network management device 230 may cause network devices (e.g., centralized unit 250, distributed unit 255, devices of a core network, or the like) to utilize the altered HARQ configuration. For example, when network management device 230 determines that there is to be an alteration to the HARQ ACK timing, network management device 230 may cause centralized unit 250 to utilize a relaxed HARQ ACK timing requirement (e.g., a greater than 4 second HARQ ACK timing requirement). Similarly, network management device 230 may cause centralized unit 250 and/or distributed unit 255 to utilize an altered quantity of HARQ processes, an altered quantity of HARQ repetitions, or the like.

In some implementations, network management device 230 may cause one or more network devices to utilize the HARQ configuration for a particular portion of the network. For example, when network management device 230 determines that there is to be an alteration to the HARQ configuration for a particular layer (e.g., Layer 1, Layer 2, or Layer 3), network management device 230 may cause distributed unit 255 to utilize the altered HARQ configuration for the particular layer. In this way granularity of control of a network is improved relative to utilizing a single HARQ configuration for each portion of a network. Additionally, or alternatively, when network management device 230 determines that there is to be an alteration to the HARQ based on a network slice, then network management device 230 may cause distributed unit 255 to utilize the altered HARQ configuration for the network slice. Additionally, or alternatively, when network management device 230 determines that there is to be an alteration to the HARQ based on a particular use case (e.g., a mobile broadband use case or an IoT use case), a particular type of communication (e.g., an IoT machine type communication or an emergency services communication), or the like, network management device 230 may cause distributed unit 255 to utilize the altered HARQ configuration for the particular use case. For example, distributed unit 255 may change a stored HARQ ITT parameter to adjust the HARQ configuration. Similarly, distributed unit 255 may change a quantity of concurrent HARQ processes that may be performed.

In some implementations, network management device 230 may cause network devices to utilize the HARQ configuration based on a network architecture. For example, when network management device 230 determines that there has been an alteration to the HARQ based on a RAN split (e.g., a change to the division of functionalities of the RAN between centralized unit 250 and distributed unit 255), then network management device 230 may cause centralized unit 250 and one or more distributed units 255 to utilize the altered HARQ configuration. In this case, the centralized unit 250 may utilize a first HARQ configuration for a first one or more distributed units 255 (e.g., associated with a first set of parameters, such as a particular use case or network metric) and a second HARQ configuration for a second one or more distributed units 255 (e.g., associated with a second set of parameters, such as another particular use case or network metric).

In some implementations, network management device 230 may cause network devices to utilize the HARQ configuration based an instruction from a network operator. For example, when network management device 230 determines that there has been an alteration to the HARQ based on an instruction from a network operator, then network management device 230 may cause centralized unit 250 or distributed unit 255 to utilize the altered HARQ configuration according to the instruction of the network operator.

In some implementations, network management device 230 may perform a validation procedure based on causing the network devices to utilize the HARQ configuration. For example, network management device 230 may determine that network performance is not adversely impacted by the HARQ configuration by monitoring network performance for a threshold period of time. In some implementations, network management device 230 may revert the HARQ configuration based on determining that network performance is adversely impacted.

In some implementations, network management device 230 may continue to monitor to detect a trigger to alter the HARQ configuration. For example, network management device 230 may monitor the network to obtain one or more network parameters, may monitor a network configuration file or a database to determine a network architecture or a network deployment, or the like, and based on detecting a trigger relating to the monitoring, network management device 230 may determine another HARQ configuration for the network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, network management device 230 enables utilization of flexible network architectures and network deployments. Additionally, or alternatively, based on permitting utilization of flexible network architectures and network deployments, network management device 230 improves network performance, relative to a static network architecture and a static network deployment, based on permitting improved centralization of network resources for a first set of network use cases and distribution of network resources for a second set of network use cases.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, or the like.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors configured to:
      detect a trigger to alter a hybrid automatic repeat request (HARQ) configuration for a network;
      determine, based on detecting the trigger, and based on a network technology associated with the network and a network performance requirement for the network, a first amount of alteration to a first HARQ timing parameter of a first HARQ configuration for a first logical network slice of one or more logical network slices and a second amount of alteration to a second HARQ timing parameter of a second HARQ configuration for a second logical network slice of the one or more logical network slices; and
      communicate with one or more network devices of the network to implement the first HARQ configuration and the second HARQ configuration.

2. The device of claim 1, where the one or more processors are further configured to:

determine another alteration to the HARQ configuration that is to be performed, including a change to at least one of:
a quantity of HARQ processes, or
a quantity of HARQ repetitions; and
communicate with the one or more network devices to cause the other alteration.

3. The device of claim 1, where the one or more processors are further configured to:
determine a transport network capability of the network;
determine another alteration to the HARQ configuration based on the transport network capability of the network; and
communicate with the one or more network devices to cause the other alteration.

4. The device of claim 3, where the transport network capability includes at least one of:
a bandwidth capability, or
a latency capability.

5. The device of claim 1, where the one or more processors are further configured to:
determine a radio access network (RAN) split of the network;
determine another alteration to the HARQ configuration based on the RAN split; and
communicate with the one or more network devices to cause the other alteration.

6. The device of claim 1, where the one or more processors are further configured to:
determine a use case for the network;
determine another alteration to the HARQ configuration based on the use case; and
communicate with the one or more network devices to cause the other alteration.

7. The device of claim 6, where the one or more processors further configured to:
determine a bandwidth requirement or a latency requirement of the use case; and
where the one or more processors, when determining the other alteration, are configured to:
determine other alteration based on the bandwidth requirement or the latency requirement of the use case.

8. A non-transitory computer-readable medium storing instructions, the instructions comprising:
one or more instructions that, when executed by one or more processors, cause the one or more processors to:
detect a trigger to alter a hybrid automatic repeat request (HARQ) configuration for a network;
determine, based on detecting the trigger, and based on a network technology associated with the network and a network performance requirement for the network, a first amount of alteration to a first HARQ timing parameter of a first HARQ configuration for a first logical network slice of one or more logical network slices and a second amount of alteration to a second HARQ timing parameter of a second HARQ configuration for a second logical network slice of the one or more logical network slices; and
communicate with a distributed unit or a centralized unit of the network to implement the first HARQ configuration and the second HARQ configuration.

9. The non-transitory computer-readable medium of claim 8, where the one or more instructions, when executed by the one or more processors, further cause the one or more processors to:
determine a set of network metrics associated with the network,
the set of network metrics including at least one of:
a network throughput,
a quantity of network traffic,
a bit error rate, or
a quantity of dropped packets.

10. The non-transitory computer-readable medium of claim 8, where the one or more instructions, when executed by the one or more processors, further cause the one or more processors to:
determine a division of radio access network (RAN) functionalities between the centralized unit and the distributed unit; and
where the one or more instructions, that cause the one or more processors to detect the trigger to alter the HARQ configuration, cause the one or more processors to:
determine that the division of RAN functionalities is changed from a previous division of RAN functionalities; and
determine to alter the HARQ configuration based on determining that the division of RAN functionalities is changed from the previous division of RAN functionalities.

11. The non-transitory computer-readable medium of claim 10, where the division of RAN functionalities includes a split of at least one of:
Layer 3 (L3) functionalities,
Layer 2 (L2) functionalities,
Layer 1 (L1) functionalities, or
radio frequency (RF) functionalities.

12. The non-transitory computer-readable medium of claim 8, where the one or more instructions, when executed by the one or more processors, further cause the one or more processors to:
determine an alteration to the HARQ configuration based on a latency requirement or a bandwidth requirement relating to the network.

13. The non-transitory computer-readable medium of claim 12, where the HARQ configuration relates to a HARQ protocol used for at least one of:
a back-haul connection,
a mid-haul connection, or
a front-haul connection.

14. The non-transitory computer-readable medium of claim 8, where the one or more instructions, when executed by the one or more processors, further cause the one or more processors to:
communicate with a network device of a core network or with a remote radio head to implement the first HARQ configuration and the second HARQ configuration.

15. A method, comprising:
detecting, by a device, a trigger to alter a hybrid automatic require (HARQ) configuration for a network,
the network including a radio access network (RAN) that includes a centralized unit and a distributed unit to perform a set of functionalities relating to transmitting information and receiving information;
determining, by the device, based on detecting the trigger, and based on a network technology associated with the network and a network performance requirement for the network, a first amount of alteration to a first HARQ timing parameter of a first HARQ configuration for a first logical network slice of one or more logical network slices and a second amount of alteration to a second HARQ timing parameter of a second HARQ configuration for a second logical network slice of the one or more logical network slices; and communicating, by the device, with one or more network devices of the network to implement the first HARQ configuration and the second HARQ configuration.

16. The method of claim 15, further comprising:
determining another alteration to a set of HARQ parameters based on a network capability of the network or a use case for the network; and
altering the set of HARQ parameters for the network based on the other alteration.

17. The method of claim 16, further comprising:
configuring a first set of HARQ parameters for a first portion of the network and a second set of HARQ parameters for a second portion of the network,
the first portion of the network being different from the second portion of the network.

18. The method of claim 16, where the network capability is a capability of at least one of:
a back-haul connection of the network,
the back-haul connection connecting a core network and the centralized unit a mid-haul connection of the network,
the mid-haul connection connecting the centralized unit and the distributed unit, or
a front-haul connection of the network,
the front-haul connection connecting the distributed unit and a remote radio head.

19. The method of claim 15, further comprising:
determining a RAN split of the network;
determining another alteration to the HARQ configuration based on the RAN split; and
communicating with the one or more network devices to implement the other alteration to the HARQ configuration.

20. The device of claim 1, where the network includes a centralized unit and a distributed unit; and
where the one or more processors are further configured to:
determine another alteration to a set of HARQ parameters based on a network capability of the network, where the network capability is a capability of at least one of:
a back-haul connection of the network,
the back-haul connection connecting a core network and the centralized unit,
a mid-haul connection of the network,
the mid-haul connection connecting the centralized unit and the distributed unit, or
a front-haul connection of the network,
the front-haul connection connecting the distributed unit and a remote radio head; and
alter the set of HARQ parameters for the network based on the other alteration.

* * * * *